March 14, 1944. H. A. SEDGWICK 2,344,114
PRESSURE REGULATOR FOR PRESSES AND THE LIKE
Filed July 15, 1940 3 Sheets-Sheet 1

Inventor
Harry A. Sedgwick
By Arthur Simon
Attorney

March 14, 1944. H. A. SEDGWICK 2,344,114
PRESSURE REGULATOR FOR PRESSES AND THE LIKE
Filed July 15, 1940 3 Sheets-Sheet 2
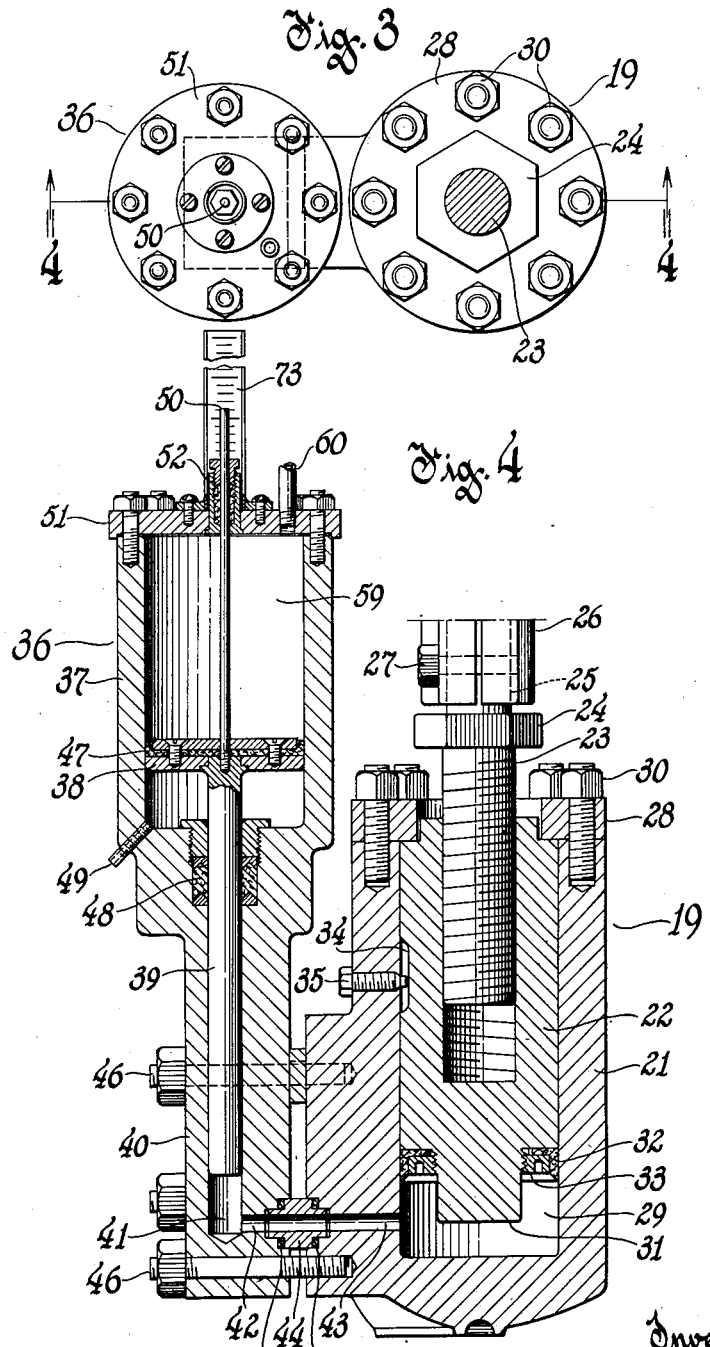
Inventor
Harry A. Sedgwick
By Arthur Simon
Attorney March 14, 1944. H. A. SEDGWICK 2,344,114
PRESSURE REGULATOR FOR PRESSES AND THE LIKE
Filed July 15, 1940 3 Sheets-Sheet 3

Inventor
Harry A. Sedgwick
By Arthur Linsey
Attorney

Patented Mar. 14, 1944

2,344,114

UNITED STATES PATENT OFFICE 2,344,114

PRESSURE REGULATOR FOR PRESSES AND THE LIKE

Harry A. Sedgwick, Shorewood, Wis.

Application July 15, 1940, Serial No. 345,664

6 Claims. (Cl. 100—70)

The invention relates to reciprocating mechanisms and is particularly applicable to mechanically operated presses for forming, embossing, coining and molding operation, extruding machines and the like which afford a great range of adjustment of their working stroke and working pressure. In many cases it is highly desirable to maintain a substantially constant pressure during nearly the entire part of the operating cycle during which the movable part of the tool is in contact with the workpiece, and the present invention affords such operation.

An object of the invention is to provide a simple mechanism for maintaining a constant pressure on the workpiece while the movable part of the tool is in contact therewith.

Another object is to provide means of the aforementioned type which permit adjustment of said pressure within wide limits.

Another object is to provide pressure regulating means which may be easily attached to presses of otherwise conventional design.

Another object is to provide pressure adjusting and maintaining means which may be easily and quickly regulated.

Another object is to provide easily adjustable pressure and stroke regulating means for mechanical presses.

Another object is to provide means of the aforementioned type which are subject to little wear and which are easily maintained.

Another object is to provide means which maintain their adjustment for a long period.

Another object is to provide pressure controlling means which have a minimum of inertia and thus respond substantially instantaneously during the operation of the machine.

Another object is to provide hydraulic pressure regulating and maintaining means which substantially eliminate leakage of the pressure fluid from the system.

Another object is to provide means in which any pressure fluid which may have leaked out of the system may be readily replaced.

Another object is to provide indicating means which indicate any loss of pressure fluid from the system.

Another object is to provide pressure regulating means which eliminate lost motion between the operating mechanism and the movable part of the tool incident to loss of pressure liquid.

Other objects and advantages will hereinafter appear.

The accompanying drawings are illustrative of certain embodiments of the invention.

In the drawings,

Figure 1 is a front view of a toggle press suitable for molding, punching and similar operations, in which one of the toggle members comprises a hydraulic cylinder and piston provided with means for varying the effective length of said toggle member while simultaneously affording regulation of the pressure which may be exerted by the toggle upon the work-piece in accordance with the present invention.

Fig. 3 is a section along the line 3—3 of Fig. 2.

Fig. 4 is a section along the line 4—4 of Fig. 3.

Fig. 7 is a modification of the press in Fig. 1 wherein the pressure regulating means are incorporated in the upper pivot point of the toggle instead of being incorporated with one of the toggle members as in the press illustrated in Fig. 1, while

Figures 1, 2:
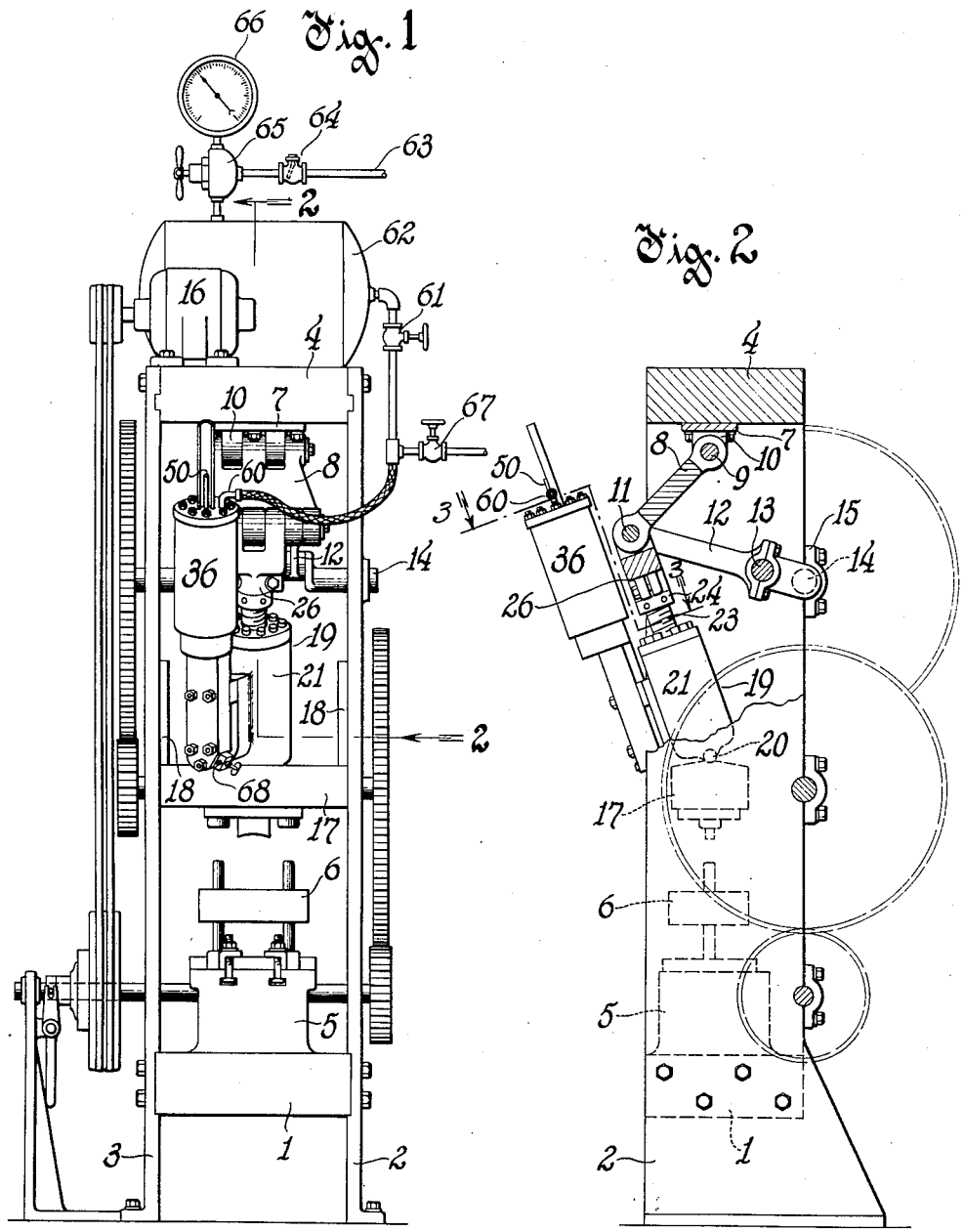
Fig. 2 is a section of the apparatus shown in Fig. 1, along the line 2—2 of Fig. 1.
Figure 5:
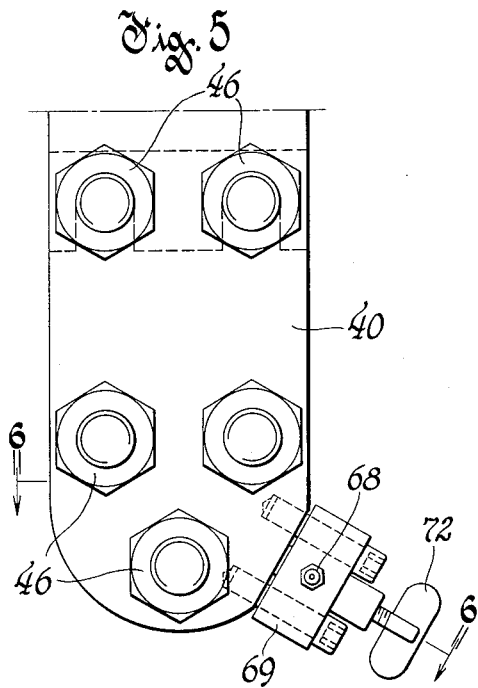
Fig. 5 is a detail of the apparatus shown in Fig. 1.

Referring to Figs. 1 to 6 inclusive, the same illustrates a toggle press having a supporting member or base 1 for a stationary platen and which is attached to and supported by side frames 2 and 3, the latter being provided with feet for mounting of the machine. The side frames 2 and 3 are joined near their upper end by a cross member or crown 4 which may be termed an abutment and which receives thrust, the base 1 and the crown 4 being suitably keyed to the side frames 2 and 3 to transmit the thrust between them to the side members. The base 1 supports a usual bolster plate 5 to which the stationary part 6 of a molding or other die may be fastened and which receives the working pressure exerted on the die and the work piece. The lower face of the crown 4 has mounted thereon a bearing block 7 which pivotally supports one end of a toggle member 8 by means of a bearing pin 9 supported in bearings 10 of the block 7. The opposite end of the toggle member 8 is provided with a bearing which supports a pin 11. Pivoted to the latter is one end of a connecting rod 12, the other end of which is pivoted to a crank pin 13 of a crank shaft 14. The crank shaft 14 in turn is pivotally supported in bearings 15 suitably mounted on the side frames 2 and 3. The crank shaft 14 may be rotated by an electric motor 16 which latter may be conveniently mounted on the crown 4 and which is operatively connected to the crank shaft 14 in any convenient manner such as belts, friction coupling and one or more sets of reduction gears as indicated in the drawings. The movable part or movable platen of the working tool is mounted on a cross head 17 which is suitably guided for reciprocation relative to the stationary tool in slides 18 attached to the frames 2 and 3. The cross head 17 is connected to the toggle pin 11 by means of a toggle member 19 which is shown more in detail in Figs. 3 and 4. The lower end of the member 19 is pivoted to the cross head 17 by means of a pin generally shown at 20 and not illustrated in detail, as this is not part of the present invention and which may be constructed in a conventional manner. The toggle member 19 includes a cylinder 21 and a cooperating piston 22 in said cylinder 21. The piston 22 is provided with a piston rod 23 which is threaded into the piston and which may be screwed into and out of the piston to afford relative longitudinal adjustment therebetween. The piston rod 23 is also provided with a collar 24 arranged for attachment of a suitable wrench for rotating it relative to the piston. The upper end of the piston rod is smooth and rotatively engages a bore 25 of an eye 26. The wall of the eye surrounding the bore is slotted and screws 27 are provided for clamping the piston rod 23 solidly in the bore after the same has been adjusted to prevent further rotation thereof. The upper end of the eye 26 is pivoted at the pin 11. Thus by turning the piston rod 23 the distance between the toggle pin 11 and the pivot 20, and therefore the length of the toggle member 19, can be varied.

The upper end of the piston 22 abuts against a collar 28 which is fastened to the upper end of the cylinder and which projects inwardly beyond the cylinder bore so that if hydraulic pressure is applied to the chamber 29 between the inner end of the piston and the cylinder, the outward movement of the piston 21 in response to said pressure is limited by the collar 28. This collar which has to resist the entire hydraulic pressure against the piston is fastened to the cylinder by means of a suitable number of studs and nuts 30. The inner end of the piston 22 is provided with an extension 31 of reduced diameter, which is adapted to limit the extreme downward stroke of the piston into the cylinder.

In order to prevent leakage of fluid from the chamber 29 past the piston 22 the latter is also provided near its lower end with an annular angle shaped packing ring 32 of suitable material, which may be held in place by a nut 33 which engages the reduced end of the piston by means of suitable co-acting threads on the nut and the piston.

In order to prevent the piston from rotation relative to the cylinder and to the piston rod 23 the piston is provided at its circumference with a longitudinal slot 34 which engages the reduced end of a cap screw 35, which is threaded through the cylinder wall, the slot 34 being of sufficient length to permit the piston to move longitudinally through the entire free length of its travel in the cylinder.

The length of the toggle link 19 is usually adjusted in such a manner that when the toggle is in approximately its lower dead-center the piston extension 31 does not make contact with the bottom face of the cylinder so that the pressure is created in the fluid contained in the compartment 29. In order to determine and regulate this pressure the cylinder 21 is provided with a regulating device 36, the latter comprising a cylinder 37 containing a piston 38. Attached to the piston 38 is a second piston or ram 39 of reduced diameter which projects through the bottom of the cylinder 37 into a cylinder 40 which forms with the cylinder 40 a cavity 41 which is in direct connection with the cylinder cavity 29 by means of aligned conduits 42 and 43 in the cylinders 40 and 21 respectively. To provide for a fluid-tight joint between the two conduits the latter are counterbored at their adjacent ends and a suitable shouldered bushing 44 is inserted into counterbored enlargements of said conduits while packing rings 45 are inserted between the shoulders on said bushing and the inner ends of said enlargements, so as to further assure the tightness of the joint. The two cylinders 40 and 21 are screwed together by studs and nuts 46 which at the same time exert sufficient pressure on the packing rings 45 to make them tight.

The piston 38 is made fluid-tight by means of a suitable packing 47 while the outer end of the ram 39 passes through a suitable stuffing box 48 to prevent escape of fluid from the chamber 41 past the ram 39 into the cylinder 37, the latter being further provided with a drain 49 to drain off any fluid which may have leaked past the stuffing box. On the side opposite from which the ram 39 extends from the piston 38 the latter is provided with a guide and indicating rod 50. The cylinder 37 is closed at its upper end by a cylinder head 51 which is provided with a stuffing box 52 through which the rod 50 projects, the stuffing box and the head 51 being arranged to provide against leakage of fluid from the upper chamber 59 formed by the cylinder 37 and the piston 38. The cylinder head 51 is also provided with an inlet conduit 60 for admission of air to the chamber 59. The conduit 60 in turn is connected through a valve 61 to a surge tank 62 which is adapted to be supplied with compressed air from any suitable source through a conduit 63, a check valve 64 and a reducing valve 65, the pressure regulator forming preferably an integral part with the reducing valve 65 which latter permits adjustment of the pressure in the surge tank 62 below that of the source. A pressure gage 66 is associated with the reducing valve 65 to indicate pressure in the tank 62. The conduit 60 is also provided with a blow-off valve 67 by means of which the fluid in the chamber 59 may be released after closure of the valve 61.

The liquid for the chambers 29 and 41 may be supplied through a suitable feeding nipple 68 which is connected to the inlet orifice of a needle valve 69, the latter being screwed into the cylinder 40 and connected with the compartment 41 through an orifice 70. The orifice 70 can thus be closed against the nipple 68 by means of the needle valve 71, which is provided with a manipulating handle 72. Thus, if it is desired to put liquid into the compartments 29 and 41, a suitable device for supplying liquid under pressure is connected to the nipple 68, the needle valve 72 is opened and liquid is forced into the cylinders and after the proper amount has been inserted the valve 72 is again closed.

The rod 50 extends outside of the cylinder 36 for a suitable distance, and mounted adjacent thereto is a graduated indicating scale 73. This scale 73 is used for adjustment of the device in the following manner: Assuming that the pressure in the surge tank 62 is to be 200 pounds per square inch and the area of each of the pistons 22 and 38 is 20 square inches and that of ram 39 is 1 square inch, then the total pressure between the cylinder 21 and the piston 22 is 80,000 pounds or 40 tons. By decreasing or increasing the pressure in the surge tank 62 by the reducing valve 65 the maximum pressure exerted between the piston 22 and the cylinder 21 may thus be varied proportionately.

The amount which the piston rod 23 extends outside of the piston 22 is normally so adjusted that when the cross head 17 is in its lowest position and exerts the desired pressure there is still some clearance between the extension 31 and the bottom of the chamber 29 so that the pressure in the surge tank also determines the pressure which is exerted on the workpiece. As the cross head 17 retracts from the stationary tool 6 the tendency is for the piston 22 to move out of the cylinder and ultimately abut against the retaining ring 28. However, as soon as the piston 22 begins to move outward and thus to increase the volume of the space 29 the pressure in the tank 62 forces the piston 38 downward, thus forcing liquid from the chamber 41 into the chamber 29, and since both the air and the liquid in the chambers 41 and 29 have very little inertia, they tend to maintain the pressure exerted between the piston 22 and the cylinder 21 constant, thus maintaining a constant force in the link 19 and thus also maintaining a substantially constant pressure on the cross head 17, which is only modified by the angularity of the toggle link, until the movable part of the tool is separated from the workpiece.

The normal amount of liquid in the chambers 41 and 29 is such that when the piston 22 abuts against the retaining ring 28 the rod 50 is opposite a mark on the scale 73 which permits a substantial leakage from the chambers 41 and 29 before the piston can hit against the bottom of the cylinder under the pressure exerted by the press. Thus as long as the rod 50 extends normally within given marks of the scale 73, all lost motion of the piston 22 relative to the liquid is obviated. As the toggle straightens out the piston 22 forces liquid from chamber 29 into the chamber 41 thus forcing up the pistons 39 and 38 and forcing air back into the surge tank 62, but by making the surge tank of sufficient size no appreciable increase in pressure therein takes place and therefore the pressure exerted by the cylinder 21 and the cross head 17 will remain substantially constant.

From the foregoing it will be seen, that it is possible to adjust the maximum pressure which is exerted upon the workpiece within very wide limits and to also maintain this pressure substantially constant for any desired part of the stroke. It will also be apparent that the surge tank may be divided into several individual chambers connected in parallel, and by disconnecting some of the chambers the pressure variations due to the return of air from the space 59 into the surge tank upon the down stroke of the press will increase. Thus by regulating the effective volume of the surge tank the pressure exerted upon the workpiece can be increased in a well known manner, similar to the increase of pressure which might be obtained by the employment of springs and such an arrangement would even permit of very much greater variations and more convenient adjustment of the pressure, than is practical with springs.

It will also be apparent, that if liquid should leak out of the chambers 29 and 41 the piston 39 would descend under the pressure of the air in the chamber 59 until the indicator 50 descends down on the scale 73 to a point which indicates to the operator that he has to replenish the liquid in the manner aforedescribed.

If it is desired to change the tool for different types of work on the press and this requires a variation of the distance between the stationary and the movable part of the die it is only necessary to change the adjustment between the screw 23 and the piston 22 in the manner aforedescribed.

Figure 7:
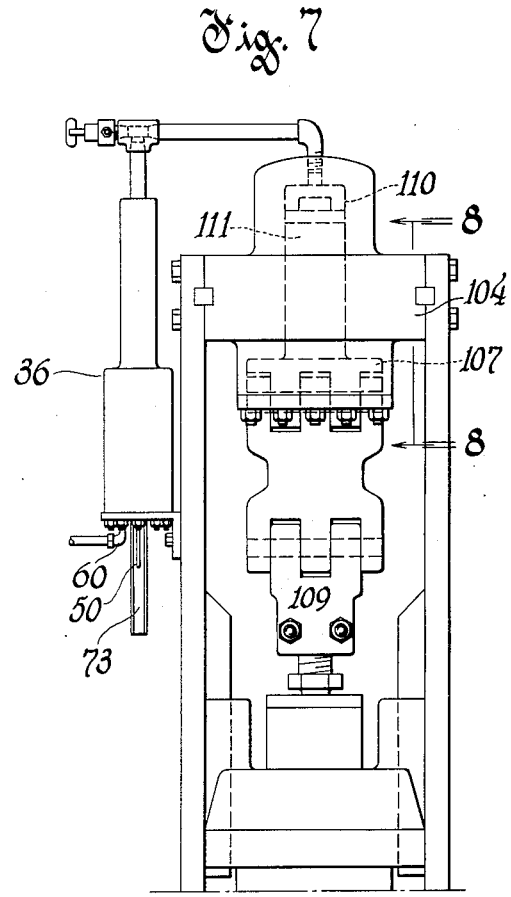
Figure 6:
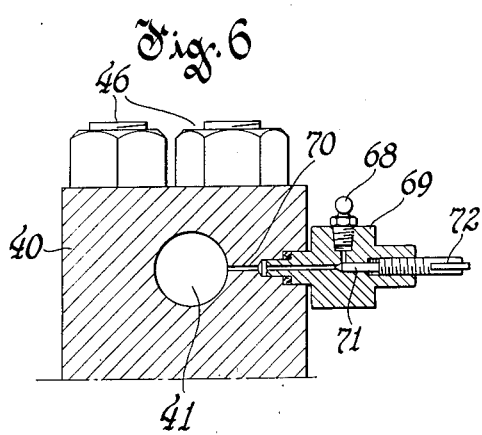
Fig. 6 is a section along the line 6—6 of Fig. 5.

In the press shown in Fig. 7 the toggle member 109 corresponding to the toggle arm 19 of Figs. 1 and 2 is provided with a conventional screw adjustment to vary its length. On the other hand the upper toggle arm is supported in a cross head bearing 107 which is not fixed to the crown 104 directly but the crown is provided with a bore or cylinder 110, while the bearing 107 is provided with a piston 111 which fits into said cylinder 110, the crown 104 being provided with lugs 112 forming guides for the bearing 107 and with stop plates 113 to limit the downward stroke of the bearing 107 and the piston 111.

Figure 8:
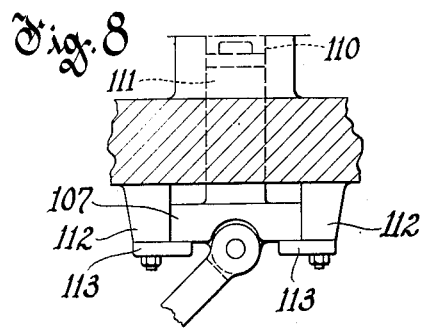
Fig. 8 is a section along the line 8—8 of Fig. 7.

In the modification just described the regulating device 36 is similar to that shown in Fig. 4 except that it is turned through 180° and it is connected with the cylinder 110 and cooperates therewith in a manner similar to that described in connection with Fig. 4. It will be seen that in the construction shown in Figs. 7 and 8 the bearing 107 has a limited up and down motion which produces a hydraulic effect similar to that aforedescribed, so as to limit and regulate the pressure which is exerted by the press upon the workpiece. It is believed that in view of the foregoing the operation of the press shown in Fig. 7 will be obvious.

What I claim as new and desire to secure by Letters Patent is:

1. In a press, a fixed abutment, a movable platen, a linkage interconnecting said abutment and said platen and operable to effect reciprocation of said platen, one link of said linkage including a cylinder and a piston arranged to permit a limited relative displacement therebetween, and means for maintaining liquid under pressure in said cylinder to provide a resilient connection between the ends of said link, said means including a chamber rigidly connected to and in hydraulic communication with said cylinder, and a reciprocable differential piston in said chamber adapted to be acted upon by a source of fluid pressure and thereby to exert and maintain a pressure on the liquid in said cylinder.

2. The combination of a mechanical press having a fixed abutment, a movable platen and a linkage interconnecting said abutment and said platen and operable to effect reciprocation of said platen, a cushioned connection associated with said linkage comprising a housing providing a main chamber and a main piston reciprocable in said main chamber, said main chamber and said piston being arranged to permit limited relative movement therebetween and adapted to receive a liquid under pressure to form therewith a cushioning means, an auxiliary chamber in hydraulic communication with said main chamber, an auxiliary piston reciprocable in said auxiliary chamber in response to the difference in the force exerted thereupon by the pressure of a liquid in said chambers and a force in opposition to said former force, a constant volume of liquid under substantially constant pressure in said chambers, and means for maintaining the pressure of said liquid at all times substantially constant, said last mentioned means including a cylinder, and a piston in said cylinder connected to said auxiliary piston and always maintained spaced from the heads of the cylinder to exert upon the auxiliary piston at all times a substantially constant force which balances at all times the force exerted thereupon by the pressure of said liquid.

3. The combination of a mechanical press having a fixed abutment, a movable platen and a linkage interconnecting said abutment and said platen and operable to effect reciprocation of said platen, a cushioned connection associated with said linkage comprising a housing providing a main chamber and a main piston reciprocable in said main chamber, said main chamber and said piston being arranged to permit limited relative movement therebetween and adapted to receive a liquid under pressure to form therewith a cushioning means, an auxiliary chamber in hydraulic communication with said main chamber, an auxiliary piston reciprocable in said auxiliary chamber in response to the difference in the force exerted thereupon by the pressure of a liquid in said chambers and a force in opposition to said former force, a constant volume of liquid under substantially constant pressure in said chambers, and means for maintaining the pressure of said liquid at all times substantially constant, said last mentioned means including a cylinder, and a piston in said cylinder connected to said auxiliary piston and always maintained spaced from the heads of the cylinder to exert upon the auxiliary piston at all times a substantially constant force which balances at all times the force exerted thereupon by the pressure of said liquid, and a source of fluid of substantially constant pressure connected with the side of the said piston in said cylinder farthest from said auxiliary piston.

4. The combination of a mechanical press having a fixed abutment, a movable platen and a linkage interconnecting said abutment and said platen and operable to effect reciprocation of said platen, a cushioned connection associated with said linkage comprising a housing providing a main chamber and a main piston reciprocable in said main chamber, said main chamber and said piston being arranged to permit limited relative movement therebetween and adapted to receive a liquid under pressure to form therewith a cushioning means, an auxiliary chamber in hydraulic communication with said main chamber, an auxiliary piston reciprocable in said auxiliary chamber in response to the difference in the force exerted thereupon by the pressure of a liquid in said chambers and a force in opposition to said former force, a constant volume of liquid under substantially constant pressure in said chambers, and means for maintaining the pressure of said liquid at all times substantially constant, said last mentioned means including a cylinder, and a piston in said cylinder connected to said auxiliary piston and always maintained spaced from the heads of the cylinder to exert upon the auxiliary piston at all times a substantially constant force which balances at all times the force exerted thereupon by the pressure of said liquid, and a closed vessel adapted to store a gas at a given pressure and connected to said cylinder to transmit the pressure of said gas to said cylinder and regulate the pressure of said liquid in accordance with the pressure of said gas.

5. The combination of a mechanical press having a fixed abutment, a movable platen and a linkage interconnecting said abutment and said platen and operable to effect reciprocation of said platen, a cushioned connection associated with said linkage comprising a housing providing a main chamber and a main piston reciprocable in said main chamber, said main chamber and said piston being arranged to permit limited relative movement therebetween and adapted to receive a liquid under pressure to form therewith a cushioning means, an auxiliary chamber in hydraulic communication with said main chamber, an auxiliary piston reciprocable in said auxiliary chamber in response to the difference in the force exerted thereupon by the pressure of a liquid in said chambers and a force in opposition to said former force, a constant volume of liquid under substantially constant pressure in said chambers, and means for maintaining the pressure of said liquid at all times substantially constant, said last mentioned means including a cylinder, and a piston in said cylinder connected to said auxiliary piston and always maintained spaced from the heads of the cylinder to exert upon the auxiliary piston at all times a substantially constant force which balances at all times the force exerted thereupon by the pressure of said liquid, and a closed vessel adapted to store a gas at a given pressure and connected to said cylinder to transmit the pressure of said gas to said cylinder and regulate the pressure of said liquid in accordance with the pressure of said gas, and means connected to said piston in said cylinder to indicate the volume of said liquid and the relative position between said main chamber and the main piston.

6. The combination with a mechanical press provided with a fixed abutment and a movable platen, of a toggle linkage interconnecting said abutment and said platen, means connected to the knee of the toggle for operating the latter to effect reciprocation of said platen, one link of said linkage comprising a casing provided with a main chamber and a main piston reciprocable in said chamber to permit limited relative displacement between the piston and chamber, and means for maintaining liquid under pressure in said chamber to provide a resilient connection between the ends of said one link, said means including an auxiliary chamber in hydraulic communication with said main chamber, an auxiliary piston reciprocable in said auxiliary chamber and subjected to the pressure of the liquid in said main chamber, and means connected to said auxiliary piston to exert a substantially constant force upon said auxiliary piston in opposition to the pressure of the liquid in said main chamber.

HARRY A. SEDGWICK.